Dec. 24, 1935.   R. A. McINTYRE   2,025,296
VALVE
Filed Dec. 10, 1934
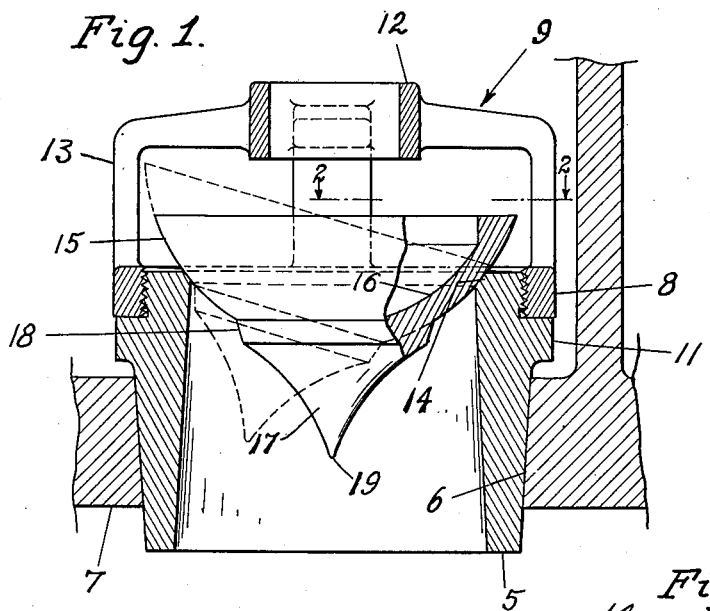
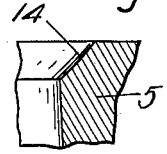
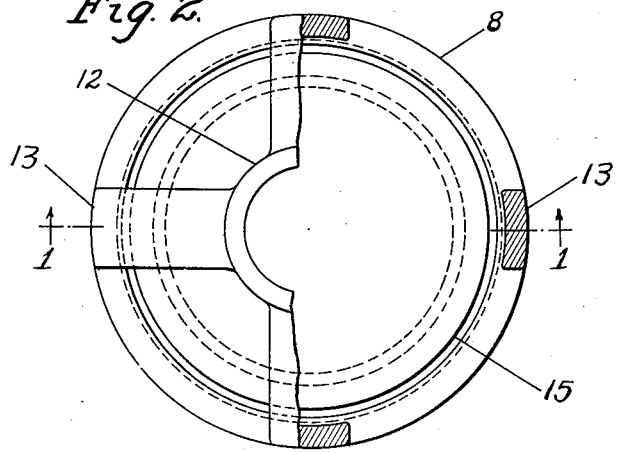
INVENTOR.
Robert A. McIntyre
BY
Robt. D. Pearson
ATTORNEY.

Patented Dec. 24, 1935

2,025,296

UNITED STATES PATENT OFFICE 2,025,296

VALVE

Robert A. McIntyre, Bell, Calif.

Application December 10, 1934, Serial No. 756,842

3 Claims. (Cl. 251—127)

This invention relates to a simplified gravity controlled check valve construction.

Among the objects of the invention are to provide improved means to cause the valve to close quickly and accurately; to provide for a superior wear resisting construction; and to secure a more satisfactory and dependable valve operation by an exceedingly simple construction capable of being manufactured at a low cost.

Other objects, advantages and features of the invention may hereinafter appear.

Referring to the accompanying drawing which illustrates what is at present deemed to be a preferred embodiment of the invention, Fig. 1 is a vertical section on line 1—1 of Fig. 2.

Fig. 2 is a partly plan and partly sectional view, the sectional portion being taken on line 2—2 of Fig. 1.

Fig. 3 is an enlarged reproduction of a fragment of Fig. 1.

Referring in detail to the drawing, the valve seat member may consist of a replaceable sleeve 5 which may be downwardly tapered externally and internally as shown, its external taper adapting it for ready insertion into and removal from a corresponding tapered aperture or bore 6 in the bed member 7.

The upper end of the sleeve 5 is externally screw threaded to receive the annular part 8 of the valve cage 9. Below its threaded portion said sleeve has an annular external shoulder 11 which forms a stop against which the valve cage abuts when fully screwed down. The upper central member 12 of the valve cage, which may be either open or closed, serves as a means for uniting the upper end portions of the arms 13 of the valve cage.

The upper end of the sleeve 5 is furnished with an annular valve seat 14 which is transversely curved or concave to adapt it to conform accurately to the seat engaging surface of the check valve proper 15.

Said valve proper consists of a segmentally spherical body the convex side of which forms the seat engaging surface and the upper side of which is cavitated at 16 as shown, thus forming what may be termed a concavo-convex disc. From the central portion of the convex face of this disc projects a downwardly tapered extension 17 which, near its junction with the disc is furnished with an annular shoulder 18 shaped to abut squarely against the inner surface of the upper part of the sleeve 5 whenever the valve proper oscillates to the limit towards the side of its seat, as indicated by dotted lines in Fig. 1.

Below its shoulder 18 the extension 17 is of a concavely conical shape and terminates in an apex 19, this formation being provided in order to afford a minimum obstruction to the flow of gas or liquid passing through the valve. A definite obtuse angle is provided around the base portion of the concave extension 17 and the stop shoulder 18.

The extension 17, in addition to its use as a stop means to limit the valve oscillation, acts as a weight which aids in causing a quick and accurate return of the valve to its seat. The cavity 16 in the upper side of the valve proper, by lightening the portion of the movable part of the valve above its seat face cooperates with the weight extending from its lower side to center the valve accurately upon its seat.

The valve 15 and its stop shoulder 18 will also function to limit the rocking movements of the valve if the latter is located in a horizontally or otherwise directed passage.

I claim:

1. A valve construction comprising a circular seat which surmounts a circular passage, and a gravity controllable rockable check valve having a convex surface to engage said seat and a downward extension projecting centrally from said surface, said extension being surrounded by a continuous annular stop shoulder which has a cylindrical surface matching with and abuttable lengthwise against said passage to limit the rocking movements of said check valve.

2. A valve construction comprising a circular seat around the mouth portion of a downwardly extending passage, and a gravity controlled check valve consisting of a concavo-convex body the convex face of which affords a seat engaging surface, said body having an externally concaved otherwise substantially conical downward extension projecting centrally from said convex face, there being an annular stop shoulder extending around the base portion of said extension, the surfaces of said shoulder and extension meeting at an angle whereby said shoulder is adapted to form a positive stop element to limit the rocking movements of the valve.

3. The subject matter of claim 2 and, said stop shoulder being positioned to contact with said passage at points below the level of said seat.

ROBERT A. McINTYRE.